(12) United States Patent
Kitagawa

(10) Patent No.: US 8,196,606 B2
(45) Date of Patent: Jun. 12, 2012

(54) COUPLING MEMBER FOR PIPE COUPLING

(75) Inventor: Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 328 days.

(21) Appl. No.: 12/515,133

(22) PCT Filed: Nov. 13, 2007

(86) PCT No.: PCT/JP2007/071979
§ 371 (c)(1),
(2), (4) Date: May 15, 2009

(87) PCT Pub. No.: WO2008/059822
PCT Pub. Date: May 22, 2008

(65) Prior Publication Data
US 2010/0051129 A1  Mar. 4, 2010

(30) Foreign Application Priority Data
Nov. 17, 2006  (JP) ................. 2006-311194

(51) Int. Cl.
*F16L 37/32*  (2006.01)
(52) U.S. Cl. ........... 137/614.04; 137/614.03; 251/149.6; 251/359; 251/900
(58) Field of Classification Search ..... 137/614–614.05; 251/149.1, 149.6, 359, 900
See application file for complete search history.

(56) References Cited

U.S. PATENT DOCUMENTS

| | | | | |
|---|---|---|---|---|
| 2,319,015 A | * | 5/1943 | Speth | 137/614.03 |
| 2,761,469 A | * | 9/1956 | Hansen | 137/614.05 |
| 3,097,867 A | * | 7/1963 | Saloum | 137/614.03 |
| 3,144,237 A | * | 8/1964 | Zurit et al. | 251/149.6 |
| 3,301,272 A | * | 1/1967 | Petty et al. | 137/614.06 |
| 4,373,551 A | * | 2/1983 | Shindelar | 137/614.06 |
| 5,709,243 A | | 1/1998 | Wells et al. | |
| 6,056,010 A | * | 5/2000 | Wells | 137/614.06 |

(Continued)

FOREIGN PATENT DOCUMENTS
EP  1 058 044  12/2000
(Continued)

OTHER PUBLICATIONS

International Search Report issued Dec. 11, 2007 in the International (PCT) Application No. PCT/JP2007/071979.

*Primary Examiner* — Kevin Lee
*Assistant Examiner* — Craig J Price
(74) *Attorney, Agent, or Firm* — Wenderoth, Lind & Ponack, L.L.P.

(57) ABSTRACT

A coupling member is disclosed which includes a valve device that is axially movable between an open position and a closed position where the valve device closes an annular valve opening defined an outer valve seat portion and an inner valve seat portion. The valve device includes an outer annular sealing member and an inner annular sealing member. The inner annular sealing member includes an annular extending portion configured such that, when the valve device approaches the closed position, the annular extending portion sealingly engages the inner valve seat portion and is elastically bent to allow the valve device advance further to the closed position so that the outer annular sealing member positively engages the outer valve seat portion.

6 Claims, 7 Drawing Sheets

U.S. PATENT DOCUMENTS

| | | |
|---|---|---|
| 6,390,126 B1 | 5/2002 | Kimura |
| 6,830,059 B1 * | 12/2004 | Zeiber et al. ............. 137/614.03 |
| 6,926,031 B2 * | 8/2005 | Zeiber et al. ............. 137/614.03 |
| 7,575,024 B2 * | 8/2009 | Zeiber et al. ............. 137/614.05 |
| 2007/0246107 A1 * | 10/2007 | Kitagawa et al. ........ 137/614.04 |

FOREIGN PATENT DOCUMENTS

| | | |
|---|---|---|
| JP | 6-69589 | 9/1994 |
| JP | 11-501715 | 2/1999 |
| JP | 2000-346266 | 12/2000 |
| JP | 2004-278620 | 10/2004 |
| WO | 97/19289 | 5/1997 |
| WO | 98/25068 | 6/1998 |

* cited by examiner

COUPLING MEMBER FOR PIPE COUPLING

BACKGROUND OF THE INVENTION

I. Technical Field

The present invention relates to a coupling member for a pipe coupling, and more particularly, to a coupling member including an inner valve seat member disposed in the radially central portion of a cylindrical coupling body, an outer valve seat member disposed on an inner peripheral surface of the coupling body at a position corresponding to that of the inner valve seat member, and a cylindrical or annular valve member disposed in the coupling body and being displaceable in an axial direction between a closed position where the valve member engages with the inner and outer valve members to close a fluid passage of the coupling body and an open position where the valve member is apart from the inner and outer valve members to open the fluid passage.

II. Description of the Related Art

Male and female coupling members for a pipe coupling are generally provided, in a cylindrical coupling body thereof, with a valve device for opening and closing a fluid passage. There are various types of valve devices. One example is a valve device in which a cylindrical valve member is slidable along an inner peripheral surface of the coupling body, a valve seat member is disposed at the radially central position of the cylindrical body, and the valve member sealingly engages with the valve seat member to close the fluid passage when the valve member is at a fluid passage closed position. In this type of coupling member, a sealing member such as an O-ring is disposed between an outer peripheral surface of the valve member and the inner peripheral surface of the cylindrical body, thereby preventing a fluid from leaking from a gap between the male and female members (for example, U.S. Pat. No. 4,936,345). In another example, instead of using a sealing member, a valve member itself is formed of rubber or the like to also to be adapted as a sealing member (for example, Japanese Unexamined Utility Model Registration Application Publication No. 64-49791).

SUMMARY OF THE INVENTION

However, coupling members which are configured to prevent leakage in the above-described manner have the following problem.

When the valve member is at the fluid passage closed position, the valve member sealingly engages with the outer and inner valve seat portions, more specifically, annular outer and inner sealing members are sandwiched between respective the outer and inner valve seat portions and the valve member, whereby sealing is provided. However, in terms of manufacturing, it is difficult that the valve member begins to press the outer and inner sealing members simultaneously. Therefore, one of the sealing members may be pressed earlier than the other sealing member, and thus the movement of the valve member may be stopped before the other sealing member is pressed enough to provide a proper sealing effect.

The object of the present invention to provide a coupling member which can solve such a problem.

The present invention provides a female coupling member including a cylindrical coupling body (34) having a male member receiving portion (indicated by reference numeral 30 in the embodiment described later) and a fluid passage portion (32) communicating with a fluid passage of a male coupling member (14) received into the male member receiving portion (30), and a valve device which is disposed in the coupling body to open and close the fluid passage portion (32). The valve device includes an outer valve seat portion (38) projectingly formed on an inner peripheral surface of the coupling body so as to surround the male member receiving portion (30); an inner valve seat portion (42) forming an annular valve opening (40) between the outer valve seat portion (38) and the inner valve seat portion in the coupling body (34); an annular valve member (44) disposed in the coupling body (34) so as to be displaceable in the axial direction thereof between a closed position (FIG. 1) where the valve member engages with the outer and inner valve seat portions (38, 42) to close the valve opening (40) and an open position (FIG. 2) where the valve member is displaced in the axial direction away from the male member receiving portion 30 toward the fluid passage portion (32) to be apart from the outer and inner valve seat portions to open the valve opening; a spring (46) for biasing the valve member (44) in the axial direction toward the closed position; an outer annular sealing member (56) mounted on and around the valve member (44), the outer annular sealing member (56) being configured to be moved without contact with the coupling body (34) when the valve member (44) is moved between the closed position and the open position and to be forced against the outer valve seat portion (38) in the axial direction by the spring (46) to seal between an outer peripheral surface of the valve member (44) and the outer valve seat portion (38) the valve member (44) is at the closed position (FIG. 1); and an inner annular sealing member (60) having a fixed portion (60-1) fixedly attached to the valve member (44) on a radially outer side with respect to the inner valve seat portion (42) and an annular extending portion (60-2) extending radially inward beyond an annular surface (embodied as a cylindrical surface 42-1 in the embodiment), which defines the valve opening (40), of the inner valve seat portion (42), wherein, when the valve member (44) is moved from the open position toward the closed position and approaches the closed position such that the valve member (44) advances into the annular valve opening (40), the annular extending portion (60-2) of the inner annular sealing member 60 is sealingly engaged with the inner valve seat portion (42) and, upon further advancement of the valve member (44), is elastically bent while maintaining the sealingly engagement to allow the valve member (44) to reach the closed position while the annular extending portion (60-2) remains outside the annular valve opening 40. The inner annular sealing member configured to be moved without contact with the coupling body when the valve member is moved between the closed position and the open position.

Specifically, the outer annular sealing member (56) can be disposed on the outer peripheral surface (54) of the valve member.

In this female coupling member, when the valve member comes to the closed position and then the outer annular sealing member (56) is sandwiched between the outer peripheral surface of the valve member and the outer valve seat portion (38), the inner annular sealing member (60) engages with the inner valve seat portion (42) and is elastically deformed so as to be bent, thereby being pressed against the inner valve seat portion for sealing between the inner valve seat portion and the inner peripheral surface of the vale member. Therefore, the outer annular sealing member can be pressed enough to provide a proper sealing effect even after the inner annular sealing member has engaged with the inner valve seat portion.

Specifically, the inner peripheral surface of the valve member includes an annular axially-extending surface (54-4) which is advanced along the annular surface defining the valve opening, of the inner valve seat portion when the valve member comes to the closed position (FIG. 1) and an annular radially-extending surface (54-5) extending radially more outward on the side of the open position with respect to the annular axially-extending surface. The inner annular sealing member (60) has a fixed portion (60-1) fixedly attached to the valve member on the side of the open position with respect to the annular axially-extending surface (54-4) of the valve member, and an extending portion (60-2) configured to extend from the fixed portion along the annular radially-extending surface of the valve member to the radially inner side, and radially inward with respect to the annular axially-extending surface (54-4) of the valve member. When the valve member comes to the closed position, and when the annular axially-extending surface of the valve member is advanced to the inner side of the annular surface of the inner valve seat portion with the outer annular sealing member (56) being pressed against the outer valve seat portion, the extending portion (60-2) engages with the inner valve seat portion, and then, is bent, thereby being elastically deformed so as to move away from the annular radially-extending surface of the valve member.

Specifically, when the valve member comes close to the closed position, the extending portion (60-2) engages with the inner valve seat portion, and then the outer annular sealing member (56) engages with the outer valve seat portion. Then, as the valve member comes further closer to the closed position, the extending portion (60-2) is bent and elastically deformed so as to move away from the annular radially-extending surface (54-5) of the valve member with the outer annular sealing member being pressed against the outer valve seat portion.

More specifically, the extending portion (60-2) of the inner annular sealing member (60) is configured to engage with the inner valve seat portion (42) first in order that a sufficient sealing effect is provided between the inner peripheral surface of the valve member and the inner valve seat portion by the time the outer annular sealing member (56) is sandwiched between the outer peripheral surface of the valve member and the outer valve seat portion to provide a sealing effect.

The present invention also provides a female coupling member including a cylindrical coupling body having a male member receiving portion (30) and a fluid passage portion (32) communicating with a fluid passage of a male coupling member (14) received into the male member receiving portion (30), and a valve device which is disposed in the coupling body to open and close the fluid passage portion (32). The valve device includes an outer valve seat portion (38') projectingly formed on an inner peripheral surface of the coupling body (34) so as to surround the male member receiving portion (30); an inner valve seat portion (42') forming, an annular valve opening (40) between the outer valve seat portion (38') and the inner valve seat portion in the coupling body; an annular valve member (44') disposed in the coupling body so as to be displaceable in an axial direction thereof between a closed position where the valve member engages with the outer and inner valve seat portions to close the valve opening and an open position where the valve member is apart from the outer and inner valve seat portions to open the valve opening; a spring (46) for biasing the valve member toward the closed position; an inner annular sealing member (60') for sealing between the inner peripheral surface of the valve member and the inner valve seat portion by being sandwiched between the inner peripheral surface and the inner valve seat portion when the valve member is at the closed position; and an outer annular sealing member (56') which is fixedly attached to the valve member on the radially more inner side with respect to the outer valve seat portion and extends radially outward beyond an annular surface (38'-1) defining the valve opening of the outer valve seat portion, and which engages with the outer valve seat portion and is elastically deformed so as to be bent when the inner annular sealing member is sandwiched between the inner peripheral surface of the valve member and the inner valve seat portion, thereby being pressed against the outer valve seat portion for sealing between the outer valve seat portion and an outer peripheral surface of the valve member.

In this female coupling member, the construction of the outer annular sealing member and the outer valve seat portion and the construction of the inner annular sealing member and the inner valve seat portion are reversed compared with the above-described female coupling member. This construction can be as effective as that of the one described above.

Further, the present invention provides a female coupling member including a cylindrical coupling body (34) having a male member receiving portion (30) and a fluid passage portion (32) communicating with a fluid passage of a male coupling member (14) received into the male member receiving portion (30), and a valve device which is disposed in the coupling body to open and close the fluid passage portion (32). The valve device includes an outer valve seat portion (38") projectingly formed on an inner peripheral surface of the coupling body (34) so as to surround the male member receiving portion (30); an inner valve seat portion (42") forming an annular valve opening between the outer valve seat portion and the inner valve seat portion in the coupling body; an annular valve member (44") disposed in the coupling body so as to be displaceable in the axial direction thereof between a closed position where the valve member engages with the outer and inner valve seat portions to close the valve opening and an open position where the valve member is apart from the outer and inner valve seat portions to open the valve opening; a spring (46) for biasing the valve member toward the closed position; an inner annular sealing member (60") which is fixedly attached to the valve member on the radially outer side with respect to the inner valve seat portion and extends radially inwardly beyond an annular surface (42"-1), defining the valve opening, of the inner valve seat portion, and which, engages with the inner valve seat portion and is elastically deformed so as to be bent when the valve member is at the closed position, thereby being pressed against the inner valve seat portion for sealing between the inner valve seat portion and an inner peripheral surface of the valve member; and an outer annular sealing member (56") which is fixedly attached to the valve member on the radially inner side with respect to the outer valve seat portion and extends radially outward beyond an annular surface (38"-1), defining the valve opening, of the outer valve seat portion, and which engages with the outer valve seat portion and is elastically deformed so as to be bent when the valve member is at the closed position, thereby being pressed against the outer valve seat portion for sealing between the outer valve seat portion and an outer peripheral surface of the valve member.

In this female coupling member, the above-described characteristic valve structure is applied to the inner and outer sealing members, which enables proper sealing.

BRIEF DESCRIPTION OF THE DRAWINGS

FIG. 3b is a partial sectional view showing an enlarged principle part of FIG. 3a.

FIG. 4b is a partial sectional view showing an enlarged principle part of FIG. 4a.

FIG. 5b is a partial sectional view showing an enlarged principle part of FIG. 5a.

DETAILED DESCRIPTION OF THE INVENTION

The followings describe embodiments of a female coupling member according to the present invention.

Figure 1:
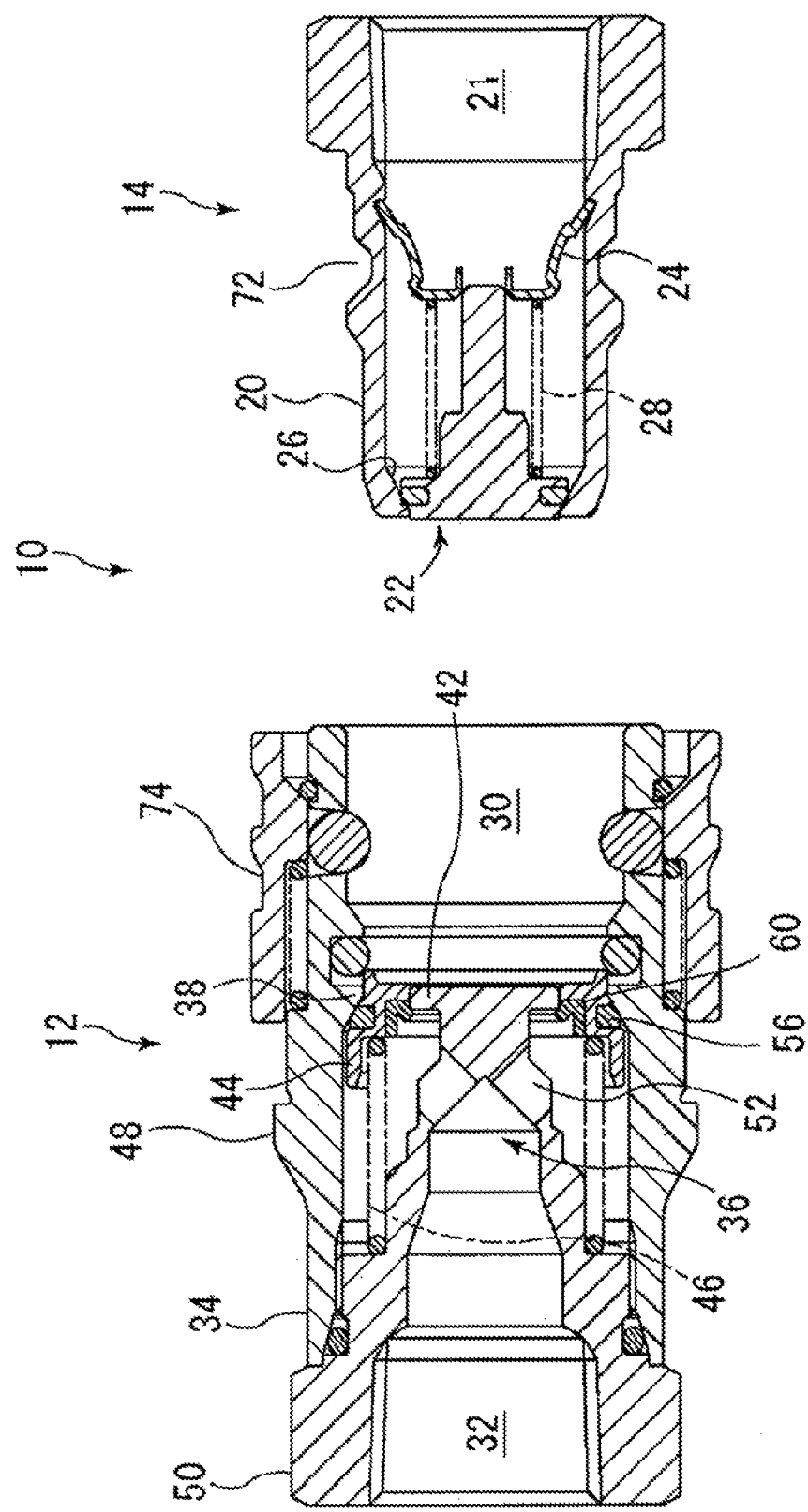
FIG. 1 is a view of a pipe coupling according to the present invention, showing a state in which a female coupling member and a male coupling member are separated from each other.

FIG. 1 shows a female coupling member 12 according to the present invention and a pipe coupling 10 including a male coupling member 14.

The male coupling member 14 includes a cylindrical coupling body 20, a valve member 22 for opening and closing a fluid passage 21 of the coupling body, a support member 24 for supporting the valve member displaceably in an axial direction of the coupling body, and a compression spring 28 for pressing the valve member 22 against a valve seat 26 formed on the inner side of an end opening of the coupling body.

The female coupling member 12 includes a male member receiving portion 30, a cylindrical coupling body 34 having and a fluid passage portion 32 communicating with the fluid passage of the male coupling member 14 received into the male member receiving portion 30, and a valve device 36 which is disposed in the coupling body and which opens and closes the fluid passage portion.

As clearly shown in FIGS. 3a to 5b, the valve device 36 includes an outer valve seat portion 38 projectingly formed on an inner peripheral surface of the coupling body 34 so as to surround the male member receiving portion 30, an inner valve seat portion 42 forming an annular valve opening 40 between the outer valve seat portion 38 and the inner valve seat portion in the coupling body 34, a valve member 44 disposed in the coupling body 34 so as to be displaceable in an axial direction thereof between a closed position (FIG. 1) where the valve member engages with the outer and inner valve seat portions 38, 42 to close the valve opening 40 and an open position (FIG. 2) where the valve member is apart from the outer and inner valve seat portions 38, 42 to open the valve opening, and a compression spring 46 for biasing the valve member 44 toward the closed position.

Specifically, the coupling body 34 is composed of a first cylindrical member 48 having the male member receiving portion 30, and a second cylindrical member 50 coupled to the first cylindrical member 48. The inner valve seat portion 42 is formed on the outer periphery of the closed front end (right end in the figure) of the second cylindrical member 50. A communicating passage 52 is formed in the side wall of the second cylindrical portion 50, and a hose (not shown) is connected to the rear end (left end) of the second cylindrical portion.

As for the valve member 44, an outer annular sealing member 56 is provided on an outer peripheral surface 54 thereof and the inner annular sealing member 60 is provided on an inner peripheral surface 58.

The outer peripheral surface 54 includes an inclined surface 54-1 generally parallel to an inclined surface 62 of the outer valve seat portion 38, a cylindrical surface 54-2, which extends forward from the front end of the inclined surface (rightward in the figure) adjacently to the cylindrical inner peripheral surface 64 inside the cylindrical inner peripheral surface 64 (forming the opening 40 between the inner valve seat portion 42 and the cylindrical inner surface) of the outer valve seat portion 38, and a cylindrical surface 54-3 extending rearward from the rear end of the inclined surface 54-1 so as to be adjacent to an inner peripheral surface of the first cylindrical member 48. The inclined surface 54-1 is biased toward the inclined surface 62 of the outer valve seat portion 38 by means of the compression spring 46. The outer annular sealing member 56 is accommodated in a seal accommodating groove 66 formed on the inclined surface 54-1. The seal accommodating groove 66 may be formed on the inclined surface 62, instead of the inclined surface 54-1, to accommodate the outer annular sealing member 56.

The inner peripheral surface 58 includes a first radially-extending surface 54-5, a second cylindrical surface 54-6, a second radially-extending surface 54-7, and a third cylindrical surface 54-8, which are disposed adjacently to the cylindrical surface in the above order from a first cylindrical surface 54-4 toward the rear, on the radially outer side with respect to a cylindrical surface 42-1, which defines the valve opening 40 of the inner valve seat portion 42. The inner annular sealing member 60 has a fixed portion 60-1 fixedly attached to the second cylindrical surface 54-6 and an annular extending portion 60-2 extending radially inward from the fixed portion. The extending portion 60-2 extends inwardly beyond the cylindrical surface 42-1 of the inner valve seat portion 42.

Figure 4A:
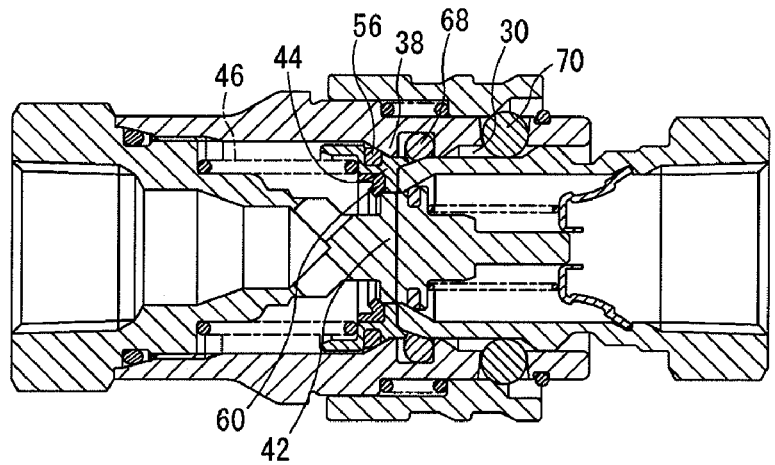
FIG. 4a is a view like FIG. 3a, but showing a state in which the valve device has come to the closed position.
Figure 4B:
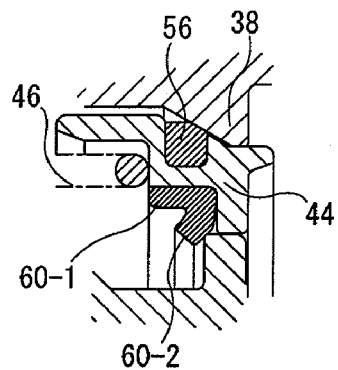
Figure 5A:
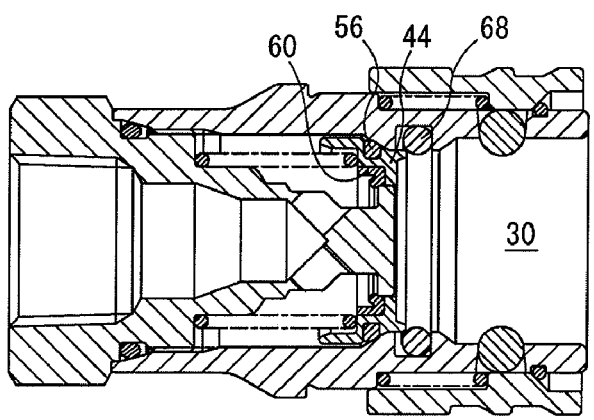
FIG. 5a is a view like FIG. 4a, but showing a state in which the inner annular sealing member has been further elastically deformed by a fluid pressure in the female coupling member.
Figure 5B:
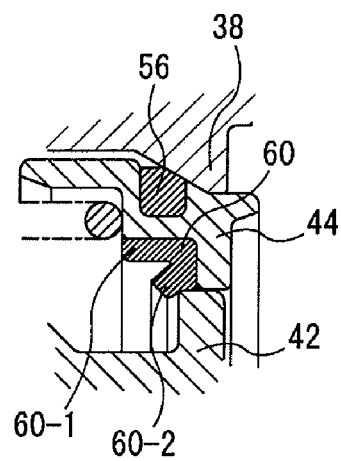

As shown in FIGS. 3a to 5b, when the valve member comes to the closed position, the extending portion 60-2 of the valve member engages with the inner valve seat portion 42 to be elastically deformed with the outer annular sealing member 56 being pressed against the outer valve seat portion 38 (FIGS. 4a, 4b).

The female coupling member 12 shown in the figures is provided with an O-ring 68 disposed on the side of the inlet with respect to the outer valve seat portion 38 of the inner peripheral surface of the coupling body 34 and the inner valve seat portion 42. When the male coupling member 14 is inserted into to coupled to the female coupling member 12 and then the sealing engagement between the outer and inner annular sealing members 56, 60, and respective the outer and inner valve seat portions 38, 42 is released, the O-ring sealingly engages with an outer peripheral surface of the male coupling member, thereby preventing a fluid from passing and then leaking outside through a gap between the inner peripheral surface of the female coupling member 12 and the outer peripheral surface of the male coupling member 14. Further, the coupling body 34 is provided with a locking element 70 displaceable in the radial direction. The locking element engages with a locking element groove 72 formed on the outer peripheral surface of the male coupling member inserted into the female coupling member, whereby the male coupling member is secured to the female coupling member. In the figure, reference numeral 74 denotes a sleeve for pressing and releasing the locking element 70, against and from the locking groove 72.

Figure 2:
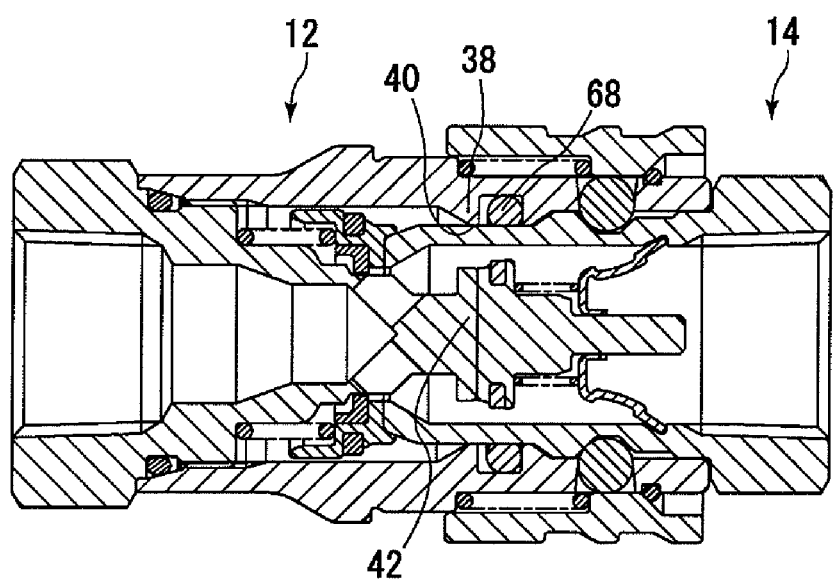
FIG. 2 shows a state in which the female coupling member and the male coupling member are coupled to each other.
Figure 3A:
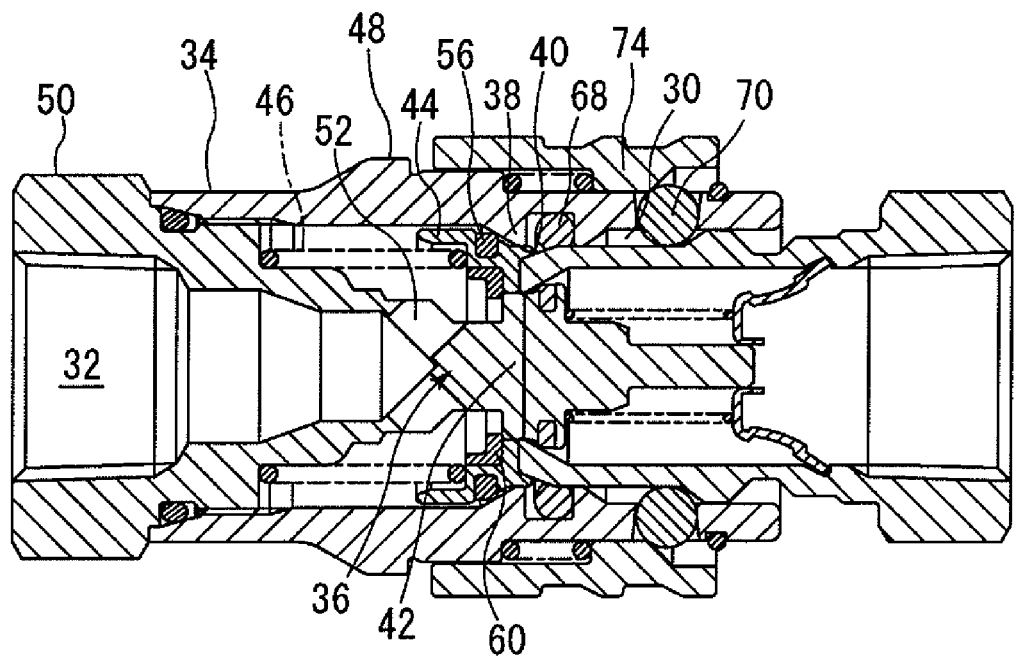
FIG. 3a is a sectional view of the female coupling member in a state in which the coupled male coupling member is being pulled out, showing a state in which a valve device has begun to move back to a closed position and an inner annular sealing member has come into contact with an inner valve seat portion.
Figure 3B:
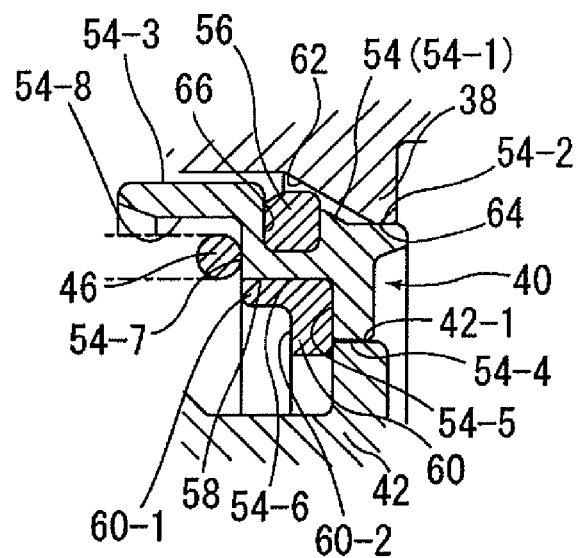

FIGS. 3 to 5*b* show the movement of the valve member 44, the outer and inner sealing members 56, 60 when the male coupling member 14 in the coupled state shown in FIG. 2 has been pulled out of the female coupling member 12.

When the valve member 44 comes close to the closed position, the cylindrical surface 54-2 of the outer peripheral surface and the first cylindrical surface 54-4 of the inner peripheral surface of the valve member 44 are advanced into the valve opening 40 first, and then the extending portion 60-2 of the inner annular sealing member 60 abuts against the inner valve seat portion 42. When the valve member 44 is further advanced toward the closed position, the outer annular sealing member 56 is engaged with and pressed against the inclined surface 62 of the outer valve seat portion 38, and at the same time, the extending portion 60-2 of the inner annular sealing member 60 is bent and elastically deformed so as to move away from the annular radially-extending surface of the valve member while engaging with the inner valve seat portion 42. Thus, the sealing engagement between the outer annular sealing member 56 and the outer valve seat portion 38 is completed, and the sealing engagement between the inner annular sealing member 60 and the inner valve seat portion 42 is also completed (FIGS. 4*a*, 4*b*). In this state, if a fluid pressure exists in the female coupling member 12, the inner annular sealing member 60 is pressed by the fluid pressure and then brought into a state shown in FIG. 5, which provides more secure sealing. As noted from the drawings, when the valve member 44 is moved between the closed position and the open position, the outer annular sealing member 56 is moved without contact with the coupling body 34.

Figure 6:
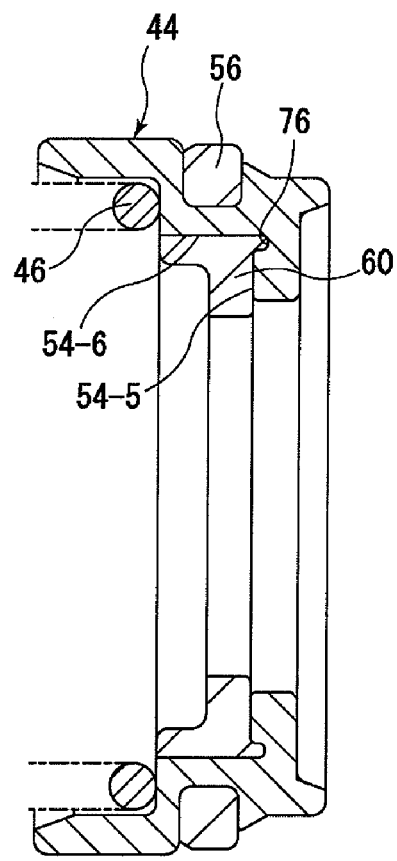
FIG. 6 shows a modification of the attachment structure of the inner annular sealing member.
Figure 7:
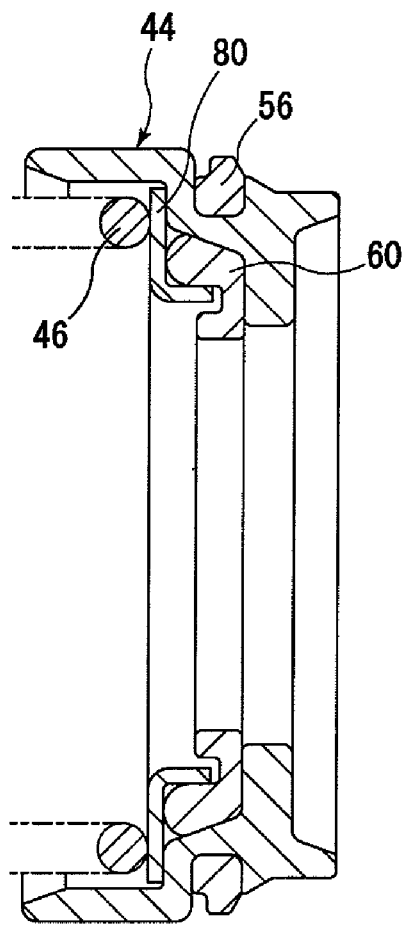
FIG. 7 shows another modification of the attachment structure of the inner annular sealing member.
Figure 8:
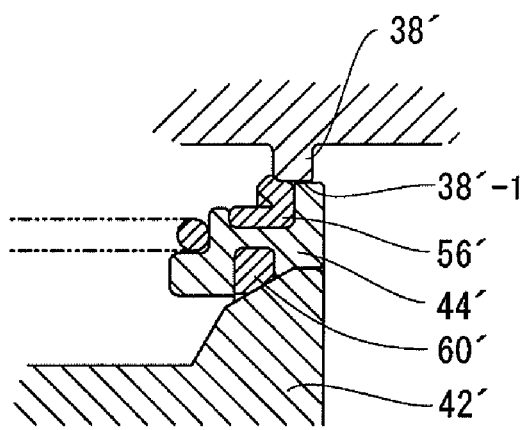
FIG. 8 is a sectional view showing a principle part of a female coupling member according to another embodiment.
Figure 9:
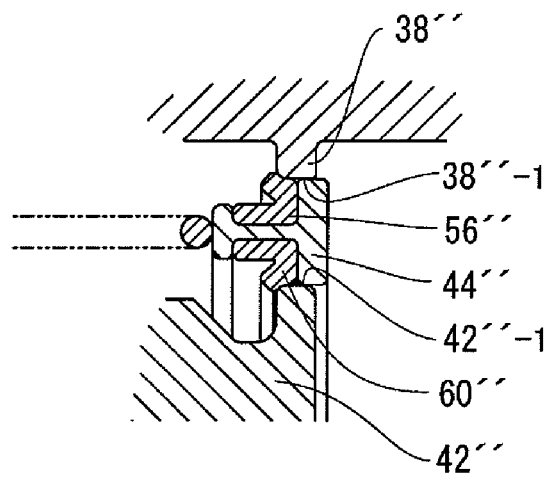
FIG. 9 is a sectional view showing a principle part of a female coupling member according to another embodiment.
Figure 10:
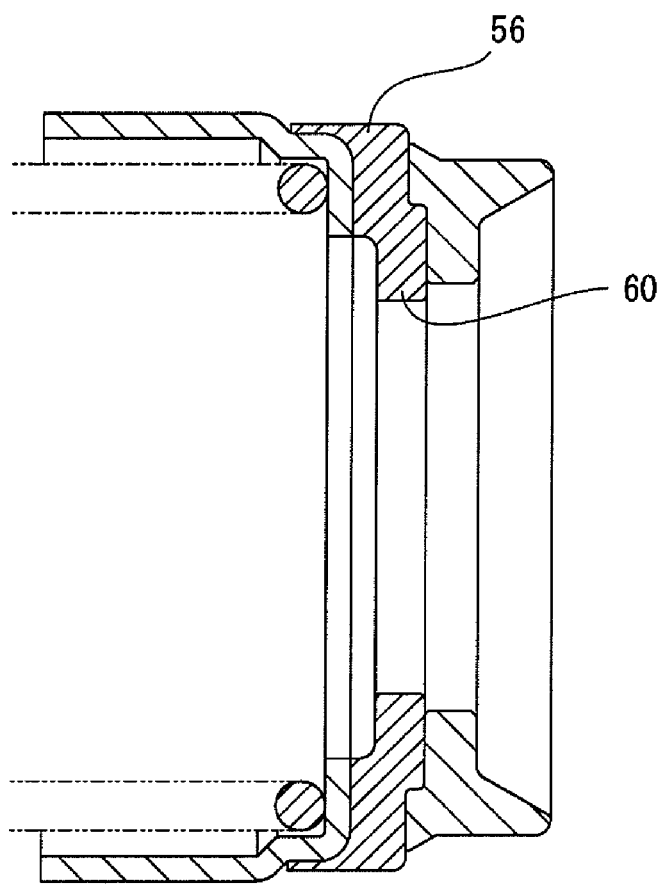
FIG. 10 is a sectional view showing a principle part of a female coupling member according to another embodiment.

The coupling member according to the present invention has been described above. However, the present invention is not necessarily limited to the above-described coupling member. For example, as shown in FIG. 8, the construction of the outer annular sealing member 56' and the outer valve seat portion 38' and the construction of the inner annular sealing member 60' and the inner valve seat portion 42' can be reversed compared with the above-described coupling member. Further, the construction of the inner annular sealing member 60 and the inner valve seat portion 42 in the above-described embodiment may be applied to the outer annular sealing member 56" and the outer valve seat portion 38", as shown in FIG. 9. In this case, it is necessary to stop the movement of the valve member, for example, by engaging the valve member itself with the outer or inner valve seat portion when the outer and inner annular sealing members are elastically deformed by a predetermined amount. Further, as shown in FIG. 6, the second cylindrical surface 54-6 may be extended to the side of the first radially-extending surface 54-5 to form a concave portion 76 along the outer periphery of the first radially-extending surface 54-5, and the inner annular sealing member 60 may be provided with an annular protrusion which is fitted in the concave portion. This construction prevents glue applied to the second cylindrical surface 54-6 from flowing to the first radially-extending surface 54-5. It is noted that glue is not necessarily used to fix the inner annular sealing member 60 to the valve member. For example, as shown in FIG. 7, an annular metal piece 80 having an L-shaped cross section may be used to fix the inner annular sealing member. Further, as shown in FIG. 10, the inner annular sealing member 60 and the outer annular sealing member 56 may be integrated into a single component.

The invention claimed is:

1. A female coupling member comprising:
   a cylindrical coupling body having a male member receiving portion and a fluid passage portion in communication with a fluid passage of a male coupling member when received into the male member receiving portion; and
   a valve device configured to open and close said fluid passage portion, said valve device being disposed in said coupling body, said valve device comprising:
      an outer valve seat portion projectingly formed on an inner peripheral surface of said coupling body so as to surround the male member receiving portion;
      an inner valve seat portion forming an annular valve opening between said outer valve seat portion and said inner valve seat portion in said coupling body;
      an annular valve member disposed in said coupling body so as to be displaceable in an axial direction thereof between a closed position where said valve member engages with said outer and inner valve seat portions to close the valve opening and an open position where said valve member is displaced in the axial direction away from said male member receiving portion toward said fluid passage portion to be apart from said outer and inner valve seat portions to open said valve opening;
      a spring configured to bias said valve member in the axial direction toward the closed position;
      an outer annular sealing member mounted on and around said valve member, said outer annular sealing member being configured to be moved without contact with said coupling body when said valve member is moved between the closed position and the open position and to be forced against said outer valve seat portion in the axial direction by said spring to seal between an outer peripheral surface of said valve member and said outer valve seat portion when said valve member is at the closed position; and
      an inner annular sealing member having a fixed portion fixedly attached to said valve member on a radially outer side with respect to said inner valve seat portion and an annular extending portion extending radially inward beyond an annular surface, which defines said valve opening of said inner valve seat portion, wherein, when said valve member is moved from the open position toward the closed position and approaches the closed position such that said valve member advances into said annular valve opening, said annular extending portion of said inner annular sealing member is sealingly engaged with said inner valve seat portion and, upon further advancement of said valve member, is elastically bent while maintaining the sealingly engagement to allow said valve member to reach the closed position while said annular extending portion remains outside said annular valve opening.

2. A female coupling member according to claim 1, wherein said outer annular sealing member is disposed on said outer peripheral surface of said valve member.

3. A female coupling member according to claim 1, wherein:
   said inner peripheral surface of said valve member includes an annular axially-extending surface which is advanced along said annular surface, defining said valve opening, of said inner valve seat portion when said valve member approaches the closed position, and an annular radially-extending surface extending radially outwardly on a side of the open position with respect to said axially-extending surface;

said inner annular sealing member has a fixed portion fixedly attached to said valve member on the side of the open position with respect to said annular axially-extending surface of said valve member, and an extending portion adapted to extend from said fixed portion, radially inwardly along said annular radially-extending surface of said valve member, to a radially inner side with respect to said inner peripheral surface of said valve member; and when said valve member approaches the closed position when said annular axially-extending surface of said valve member is advanced along said annular surface of said inner valve seat portion with said outer annular sealing member being pressed against said outer valve seat portion, said extending portion engages with said inner valve seat portion and is then bent, thereby being elastically deformed so as to move away from said annular radially-extending surface of said valve member.

4. A female coupling member according to claim 3, wherein when said valve member comes close to the closed position, said extending portion engages with said inner valve seat portion, and then said outer annular sealing member engages with said outer valve seat portion, and wherein as said valve member comes further closer to the closed position, said extending portion is bent and elastically deformed so as to move away from said annular radially-extending surface of said valve member with said outer annular sealing member being pressed against said outer valve seat portion.

5. A female coupling member comprising:
a cylindrical coupling body having a male member receiving portion and a fluid passage portion in communication with a fluid passage of a male coupling member when received into the male member receiving portion; and
a valve device configured to open and close said fluid passage portion disposed in said coupling body, said valve device comprising:
an outer valve seat portion projectingly formed on an inner peripheral surface of said coupling body so as to surround said male member receiving portion;
an inner valve seat portion forming, in said coupling body, an annular valve opening between said outer valve seat portion and said inner valve seat portion;
an annular valve member disposed in said coupling body so as to be displaceable in an axial direction thereof between a closed position where said valve member engages with said outer and inner valve seat portions to close said valve opening and an open position where said valve member is displaced in the axial direction away from the male member receiving portion toward said fluid passage portion to be apart from said outer and inner valve seat portions to open the valve opening;
a spring configured to bias said valve member toward the closed position;
an inner annular sealing member configured to be moved without contact with said coupling body when said valve member is moved between the closed position and the open position and to be forced against said inner valve seat portion in the axial direction by said spring to seal between an inner peripheral surface of said valve member and said inner valve seat portion when said valve member is at the closed position; and
an outer annular sealing member having a fixed portion fixedly attached to said valve member on a radially inner side with respect to said outer valve seat portion and an annular extending portion extending radially outward beyond an annular surface of said outer valve seat portion defining a valve opening wherein when said valve member is moved from the open position toward the closed position and approaches the closed position such that said valve member advances into said annular valve opening, said annular extending portion of said outer annular sealing member sealingly engages with said outer valve seat portion and, upon further advancement of said valve member is elastically bent while maintaining the sealingly engagement with said outer valve seat portion to enable said valve member to reach the closed position while said annular extending portion remains outside said annular valve opening.

6. A female coupling member comprising:
a cylindrical coupling body having a male member receiving portion and a fluid passage portion in communication with a fluid passage of a male coupling member received into the male member receiving portion; and
a valve device, which is disposed in the coupling body, configured to open and close said fluid passage portion, said valve device comprising:
an outer valve seat portion projectingly formed on an inner peripheral surface of said coupling body so as to surround said male member receiving portion;
an inner valve seat portion forming an annular valve opening between said outer valve seat portion and said inner valve seat portion in said coupling body;
an annular valve member disposed in said coupling body so as to be displaceable in an axial direction thereof between a closed position where said valve member engages with said outer and inner valve seat portions to close said valve opening and an open position where said valve member is displaced in said axial direction away from said male member receiving portion toward said fluid passage portion to be apart from said outer and inner valve seat portions to open said valve opening;
a spring configured to bias said valve member in the axial direction toward the closed position;
an inner annular sealing member having a fixed portion fixedly attached to the valve member on a radially outer side with respect to said inner valve seat portion and an annular extending portion extending radially inward beyond an annular surface of said inner valve seat portion, defining said valve opening, wherein, when said valve member is moved from the open position toward the closed position and approaches the closed position such that said valve member advances into said annular valve opening, said annular extending portion of said inner annular sealing member sealingly engages with said inner valve seat portion and, upon further advancement of the valve member is elastically bent while maintaining the sealingly engagement with said inner valve seat portion to allow the valve member to reach the closed position while said annular extending portion remains outside said annular valve opening; and
an outer annular sealing member having a fixed portion fixedly attached to the valve member on a radially inner side with respect to the outer valve seat portion and an annular extending portion extending radially outward beyond an annular surface of said outer valve seat portion defining said valve opening, wherein when said valve member is moved from the open position toward the closed position and approaches the closed position such that said valve member advances into said annular valve opening, said annular extending portion of said outer annular sealing member sealingly engages with said outer valve seat, portion and, upon further advancement of said valve member, is elastically bent while maintaining the sealingly engagement with said outer valve seat portion to allow said valve member to reach the closed position while said annular extending portion of said outer annular sealing member remains outside said annular valve opening.

* * * * *